(12) United States Patent
Gao

(10) Patent No.: US 8,687,267 B2
(45) Date of Patent: Apr. 1, 2014

(54) OPTICAL WAVELENGTH TUNABLE FILTER

(76) Inventor: Peiliang Gao, Alviso, CA (US)

( * ) Notice: Subject to any disclaimer, the term of this patent is extended or adjusted under 35 U.S.C. 154(b) by 263 days.

(21) Appl. No.: 12/391,997

(22) Filed: Feb. 24, 2009

(65) Prior Publication Data

US 2010/0214648 A1    Aug. 26, 2010

(51) Int. Cl.
*G02F 1/33*   (2006.01)
*G02F 1/11*   (2006.01)
*G01J 3/12*   (2006.01)
*G02F 1/125*  (2006.01)

(52) U.S. Cl.
CPC ... *G02F 1/116* (2013.01); *G02F 1/11* (2013.01); *G01J 3/1256* (2013.01); *G02F 1/125* (2013.01)
USPC .......................................... 359/308; 359/305

(58) Field of Classification Search
USPC ............... 359/285–287, 305, 306, 308–314; 385/7
See application file for complete search history.

(56) References Cited

U.S. PATENT DOCUMENTS

| | | |
|---|---|---|
| 3,656,068 A | 4/1972 | Runge |
| 3,944,334 A | 3/1976 | Yano |
| 4,250,466 A | 2/1981 | Jernigan |
| 4,720,177 A | 1/1988 | Chang |
| 4,841,528 A | 6/1989 | Sipes et al. |
| 5,052,004 A | 9/1991 | Gratze |
| 5,329,397 A | 7/1994 | Chang |
| 5,446,813 A | 8/1995 | Lee et al. |
| 5,936,981 A | 8/1999 | Wada et al. |
| 6,064,510 A * | 5/2000 | Gottlieb et al. ............... 359/308 |
| 6,560,382 B1 | 5/2003 | Lasher et al. |
| 6,563,845 B2 | 5/2003 | Kumkar |
| 6,822,785 B1 | 11/2004 | Chu et al. |
| 6,930,819 B2 | 8/2005 | Chu |
| 6,944,363 B2 | 9/2005 | Li et al. |
| 7,057,799 B2 | 6/2006 | Chu |
| 7,130,319 B1 | 10/2006 | Kaneda |
| 2002/0136524 A1 * | 9/2002 | Agha Riza .................. 385/140 |
| 2003/0231666 A1 * | 12/2003 | Daiber et al. ................. 372/34 |

(Continued)

FOREIGN PATENT DOCUMENTS

| | | |
|---|---|---|
| CN | 2505867 Y | 8/2002 |
| CN | 1996073 | 7/2007 |

(Continued)

OTHER PUBLICATIONS

ISR for PCT/CN2010/072617.

(Continued)

*Primary Examiner* — Mahidere Sahle
(74) *Attorney, Agent, or Firm* — IPxLaw Group LLP

(57) ABSTRACT

An acousto-optical tunable filter is disclosed. The filter includes a medium having one or more indices of refractions alterable by the application of acoustic waves to the medium. The filter also includes an acoustic transducer coupled to the medium to generate the acoustic waves Altering the frequency of the acoustic wave selects among the different wavelengths in the incident light ray. The device also includes an optical mirror for reflecting a wave diffracted by the medium back to the medium so that it can again be diffracted. The first diffracted wave has its frequency shifted in one direction by the frequency of the acoustic wave while the second diffracted wave has its frequency shifted in the opposite direction, thereby compensating for the first shift. The result is an output ray with little or no frequency shift.

17 Claims, 3 Drawing Sheets

(56) References Cited

U.S. PATENT DOCUMENTS

| | | |
|---|---|---|
| 2005/0041911 A1* | 2/2005 | Martinelli et al. ............... 385/17 |
| 2006/0203340 A1 | 9/2006 | Hesline |
| 2007/0041075 A1* | 2/2007 | Gupta et al. .................. 359/285 |
| 2008/0037100 A1* | 2/2008 | Minemoto et al. ............ 359/285 |
| 2009/0180776 A1 | 7/2009 | Brodsky |

FOREIGN PATENT DOCUMENTS

| | | |
|---|---|---|
| CN | 101141221 | 3/2008 |
| CN | 101246239 | 8/2008 |
| CN | 101630814 | 1/2010 |
| CN | 10162988 | 3/2010 |
| CN | 101672954 | 3/2010 |
| CN | 101672986 | 3/2010 |
| CN | 101673921 | 3/2010 |
| WO | WO2007064238 A1 | 6/2007 |
| WO | PCT/CN2010/072617 | 3/2011 |
| WO | PCT/CN2010/072608 | 10/2011 |
| WO | PCT/CN2010/072624 | 10/2011 |

OTHER PUBLICATIONS

ISR for PCT/CN2010/072624.
ISR for PCT/CN2010/072608.

* cited by examiner

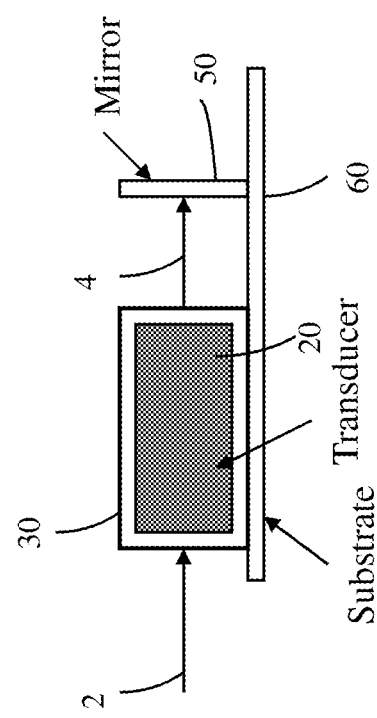
FIG. 3 Side view of AOTF

OPTICAL WAVELENGTH TUNABLE FILTER

CROSS-REFERENCE TO RELATED APPLICATIONS

1. Field of the Invention

The present invention relates generally to the field of optical filters and more particularly to the field of acousto-optical filters.

2. Description of the Related Art

The acousto-optic tunable filter (AOTF) is a solid-state electronically tunable spectral bandpass filter that operates on the principle of acousto-optic interaction in an anisotropic or isotropic medium. Most filters of this kind use anisotropic interaction. Technical progress in both crystal growth and high frequency piezoelectric transducers has greatly improved acousto-optical components. With these improvements, the AOTF has recently reached technological maturity, moving from the research laboratory to the commercial environment.

The AOTF often utilizes an anisotropic, birefringent acousto-optic (AO) medium for its operation and provides high-speed capability, proven long-term reliability, and cost effectiveness.

The operation of acousto-optic filters relies on the direction of the diffracted light being dependent on the acoustic wavelength, a phenomena called Bragg diffraction. At the most fundamental level, Bragg diffraction involves the interaction of photons (quanta of light energy) with phonons (quanta of sound energy). Both energy and momentum are conserved in this interaction.

Conservation of momentum requires $\hbar \kappa_d = \hbar \kappa_i + \hbar \kappa_s$, where $\hbar \kappa_d$ is the momentum of the diffracted photon, $\hbar \kappa_i$ is the momentum of the incident photon, and where $\hbar \kappa_s$ is the momentum of the interacting phonon. Canceling $\hbar$ leaves, $\kappa_d = \kappa_i + \kappa_s$ which gives the fundamental wavevector equation for Bragg diffraction. It states that the wavevector of the diffracted wave is the vector sum of the sound wavevector and the incident light ray wavevector.

Conservation of energy requires that $\hbar \omega_r = \hbar \omega + \hbar \Omega$, where $\omega_r$ is the radian frequency of the diffracted wave, $\omega$ is the radian frequency of the incident wave, and $\Omega$ is the radian frequency of the sound wave. Cancelling the $\hbar$ leaves the relationship $\omega_r = \omega + \Omega$. This indicates that the radian frequency of the diffracted photon is altered (slightly) by the radian frequency of the sound wave, i.e., that there is a Doppler shift of the light ray frequency.

Compared to conventional techniques, AOTFs offer continuous and agile tunability, fast access times and narrow spectral bandwidths. There are two types of the acousto-optic filters, the collinear and non-collinear filters. A non-collinear, far-off axis filter with high RF frequency can achieve narrow bandwidth tuning. However, both types of AOTF have an important but unfortunate characteristic that is exhibited by the equation $\omega_r = \omega + \Omega$, referred to above. The equation states that the sound wave shifts the optical frequency by an amount equal to the frequency of the sound wave. The optical frequency shift (OFS) comes about because the incident light reflects from surfaces that move with the velocity of the sound wave. Even though the amount of the shift is very small, because optical frequencies and sound frequencies are many orders of magnitude apart, the OFS causes unstable operation in some laser systems.

One solution to this problem is to use two AOTFs with the second one arranged to cancel the frequency shift introduced by the first one. Another solution is to use the two transducers on the same acousto-optical crystal. However, these solutions have several drawbacks: (a) they increase the size of the system, (b) they make optical alignment more difficult, (c) they cause operation instability, and (d) they increase the cost, which is very important for high volume manufacturing. Therefore, there is a need for a new filter that improves performance and reduces cost.

BRIEF SUMMARY OF THE INVENTION

One embodiment of the present invention is an acousto-optical tunable filter. The filter includes an optical medium, a means for exciting an acoustic wave in the optical medium, and an optical mirror. The optical medium has a refractive index that is alterable by acoustic waves. The optical medium receives an incident light ray that includes one or more wavevectors, all or a portion of which are within a tuning range of the filter. The means for exciting an acoustic wave sets up an acoustic wave of a particular frequency in the optical medium so that a wavevector of the incident light ray selected by the particular frequency and within the tuning range is diffracted by the optical medium. The diffracted wavevector has a frequency shift that results from the interaction of the light ray and the acoustic wave. The optical mirror has a total reflection or prescribed reflectivity to meet the tuning range and is positioned to reflect the diffracted light ray back to the optical medium. The optical medium then diffracts the reflected light ray to produce an output light ray, producing a compensating frequency shift of the reflected light ray. This substantially reduces or eliminates any frequency shift in the output light ray.

One object of the present invention is to provide an improved AOTF with capability to reduce or eliminate the optical frequency shift induced by acousto-optical Bragg diffraction.

Another object is to provide twice the diffraction of a single AOTF while maintaining a small footprint.

Yet another object is to provide an AOTF capable of narrow bandwidth tuning for use in laser systems.

Yet still another object is to reduce the material and manufacturing cost, which is particularly important for applications in telecom systems.

BRIEF DESCRIPTION OF THE DRAWINGS

These and other features, aspects and advantages of the present invention will become better understood with regard to the following description, appended claims, and accompanying drawings where:

FIG. 2-1 is a diagram of the wave vectors to illustrate the Bragg diffraction of the incident light;

FIG. 2-2 is a diagram of the wave vectors to illustrate the Bragg diffraction of the light reflected from the mirror; and FIG. 3 shows a side view of the device's physical arrangement.

DETAILED DESCRIPTION OF THE INVENTION

Figure 1:
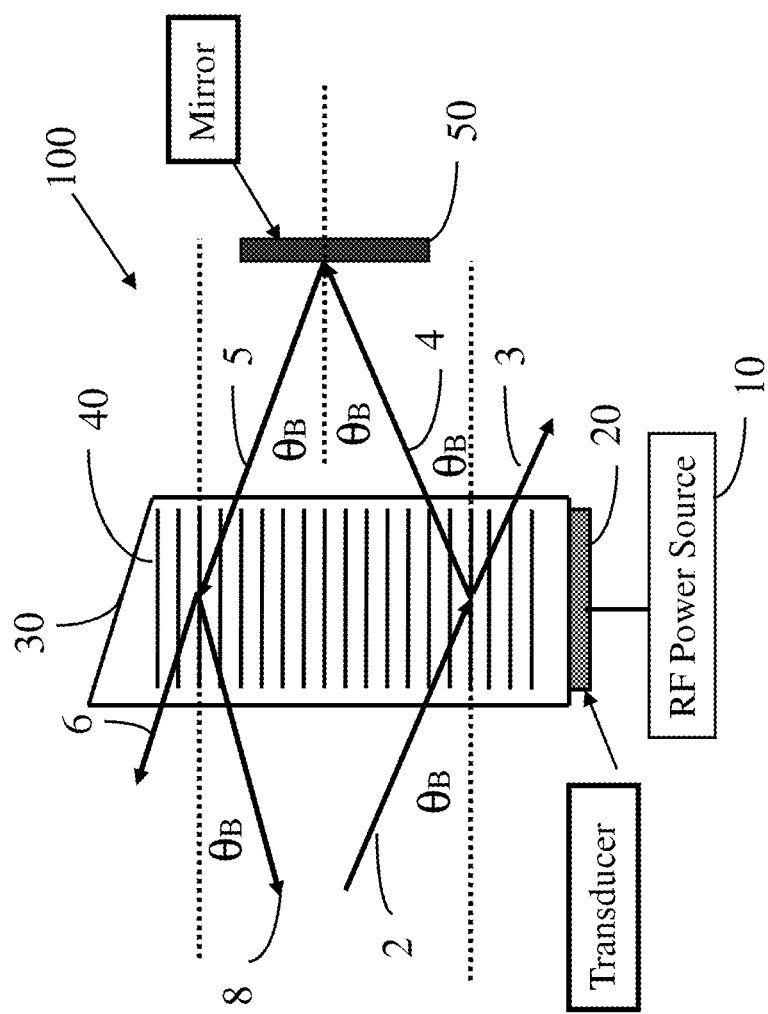
FIG. 1 shows an embodiment of present invention. The embodiment is a frequency shift compensated, wavelength tunable filter using an acousto-optical crystal and a reflective mirror.

FIG. 1 shows, in one embodiment, a compact, frequency-shift compensated, wavelength tunable optic filter. The embodiment 100 includes medium 30, an acoustical transducer 20, an RF power source 10, and an optical mirror 50. The medium 30 is such that the application of sound waves alters one or more indices of refraction of the medium.

The Medium

In one embodiment, the medium 30 is an acousto-optical crystal. In some embodiments, the medium is anisotropic and birefringent, such as when narrow band tuning is desired. One such material, TeO2, operating in shear mode has been used extensively for such applications due to its high optical homogeneity, low light absorption, high optical power capability. Other materials, such as $LiNbO_3$, GaP, $PbMoO_4$, are also used to build acousto-optical device. Several factors affect the material choice. The factors include, but are not limited to, the type of acoustic optic device, the availability of quality crystal materials, and the type of application and its requirements such as diffraction efficiency, power consumption, and separation of the incident light from diffracted light and overall device size.

The Transducer

The acoustical transducer 20 is coupled to the medium. In one embodiment, where the medium is a crystal, the acoustical transducer 20 is bonded to the crystal and usually with an angled facet opposite to the facet bonded with transducer 20. This eliminates the back reflected acoustic wave from interfering with the forward traveling acoustic waves thereby improving the performance stability.

Power Source

The RF power source 10 drives the acoustical transducer 20 to propagate sound waves 40 in the medium 30. While frequencies for many common applications range from 50 MHz to a few hundred MHz, the RF power source is preferably capable of providing frequencies up to 10 GHz.

Mirror

The mirror 50 is positioned to reflect waves diffracted by the medium 30, with the applied sound waves 40, back to the medium 30. In one embodiment, the mirror 50 is a flat mirror. In other embodiments, the mirror is concave, convex, or optically dispersive. Preferably, the distance between the mirror and the medium 30 is adjustable. In some embodiments, additional optical components, such as an optical phase modulator, are inserted into the optical path between the input light ray and the output light ray.

Operation

Collimated light ray 2 includes one or more wavevectors of light, all or a portion of which are within the tuning range of the filter. In operation, the light ray 2 enters the acousto-optic crystal 30 at Bragg angle, $\Theta_i = \Theta_B$ (i.e., the incident angle equals the Bragg angle). The Bragg angle can be calculated by the equation, $\sin \Theta_B = \lambda_0/(2 n\Lambda)$, where $\lambda_0$ is optical wavelength of the incident light, n is the average refractive index of the medium, $\Lambda$ is the acoustic wavelength. In practice, $\Theta_B$ is very small. For example, for $\lambda_0 = 1.55$ µm, at 1 GHz RF frequency, for an acoustic crystal with acoustic wave velocity $v_s = 2$ km/sec and n=2.5, the Bragg angle, $\Theta_B$ is 8.9°. The acoustic wave 40, established by the transducer, diffracts the optical ray 2 into $1^{st}$ order light ray 4 with an output angle $\Theta_B$ and a $0^{th}$ order light ray 3 propagating in the same direction as the incident ray 2. Changing the RF frequency of the power source 10 changes the wavevector κ of the diffracted light in order to meet the Bragg diffraction condition at the same diffraction angle of $\Theta_B$. Thus, the frequency of the power source 10 is the means by which the filter selects a wavevector (i.e., a wavelength, because the direction is given) within the tuning range for output. Mirror 50 reflects the diffracted light ray 4 back to the medium 30 at angle $\Theta_B$ as light ray 5. Now the acoustic wave 40 diffracts light ray 5 into $1^{st}$ order light ray 8 with an output angle $\Theta_B$ and a $0^{th}$ order light ray 6, which propagates in the same direction as the incident ray 5.

Figures 1, 2:
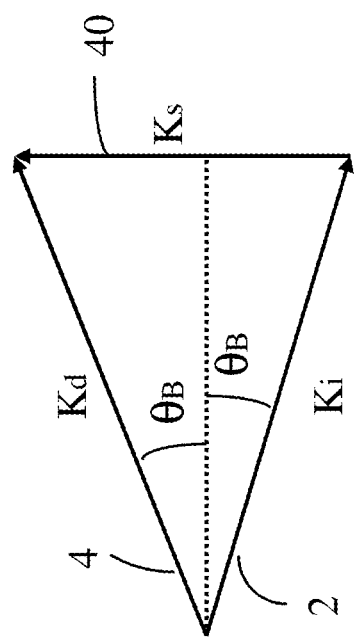
Figure 2:
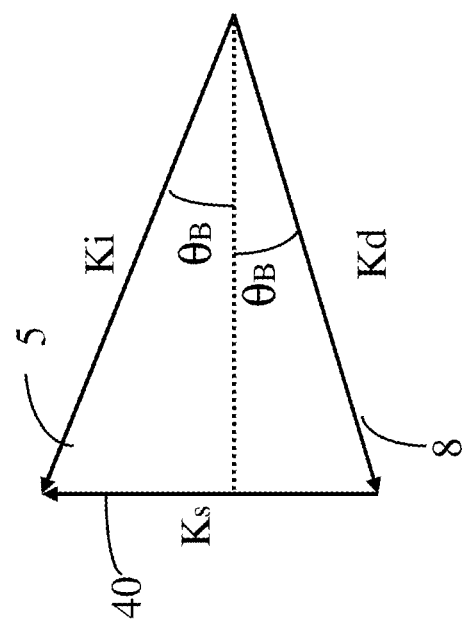

FIG. 2-1 and FIG. 2-2 show the relationships between the wavevectors of incident light ($\kappa_i$), diffracted light ($\kappa_d$) and acoustic waves ($\kappa_s$). As mentioned above, the relationship $\kappa_i \pm \kappa_s = \kappa_d$ always applies, where "+" or "−" depends on the direction in which the acoustic wave propagates.

In FIG. 2-1, the wavevector relationship for light ray 2 ($\kappa_2$), light ray 4 ($\kappa_4$) and acoustic wave 40 ($\kappa_s$) is $\kappa_2 + \kappa_s = \kappa_4$. Not only is the direction of the diffracted wave shifted upward by the sound wavevector $\kappa_s$, but also the radian frequency ω of the light ray is shifted up by $\Omega = v_s|\kappa_s|$, where $v_s$ is the velocity of the acoustic wave.

In FIG. 2-2, the wave vector relationship for light ray 5 ($\kappa_5$), light ray 8 ($\kappa_8$.) and acoustic wave 40 ($\kappa_s$) is $\kappa_5 - \kappa_s = \kappa_8$. In this case, the acoustic wave shifts the direction of the diffracted wave downward, and it shifts the radian frequency ω of the second diffracted light ray 8 down by $v_s|\kappa_s|$. Because the upshift and the downshift are approximately equal, the overall frequency shift of the light ray 8 delivered from the acousto-optical filter 100 is substantially eliminated.

In a system, light ray 3 and light ray 6 may be used for system intensity monitoring or other purposes.

FIG. 3 shows a side view of the AOTF, which includes a crystal 30 and mirror 50 bonded to a substrate 60. The transducer 20 is coupled to the side of the crystal. The substrate 60 is a low thermal expansion coefficient material such as Kovar to reduce performance instability.

Although the present invention has been described in considerable detail with reference to certain preferred versions thereof, other versions are possible. For example, all facets of the acoustic crystal can be coated with the multiple layers of anti-reflection dielectric thin film coatings to reduce the reflection loss. In another version, the reflection mirror can be a concave type, or other type of reflective optical elements for optical wave front distortion compensation to improve the light ray quality and for other purposes in a particular system. Therefore, the sprit and scope of the appended claims should not be limited to the description of the preferred versions contained herein.

What is claimed is:

1. An acousto-optical tunable filter comprising:
    an optical medium whose refractive index is alterable by acoustic waves, said optical medium receiving an incident light ray that includes one or more wavevectors, all or a portion of which are within a tuning range of the filter;
    means for exciting an acoustic wave of a particular frequency in said optical medium so that each wavevector of the incident light ray selected by the particular frequency and within the tuning range is diffracted by said optical medium, each diffracted wavevector having a frequency shift; and
    an optical mirror having a total reflection or prescribed reflectivity to meet the tuning range, said optical mirror positioned to receive each diffracted wavevector at a non-orthogonal incident angle and to reflect each received diffracted wavevector at a reflected angle opposite the incident angle back to said optical medium, wherein said optical medium diffracts each reflected wavevector to produce an output light ray having a compensating frequency shift in each reflected wavevector, thereby substantially reducing or eliminating any frequency shift in the output light ray;
    wherein said optical mirror has an optical characteristic taken from the group consisting of: concave, convex, optically dispersive, or any combination thereof.

2. The wavelength tunable filter of claim 1, further comprising a source of radio frequency electrical power coupled to said exciting means to provide power to the exciting means at the particular frequency.

3. The wavelength tunable filter of claim 1, wherein the optical medium is an acousto-optical crystal.

4. The wavelength tunable filter of claim 3, wherein said acousto-optical crystal has a number of facets, each coated with the anti-reflective multiple layers of a dielectric thin film to reduce optical reflection loss and overall insertion loss of said tunable filter.

5. The wavelength tunable filter of claim 3, wherein the acousto-optical crystal is an anisotropic and optically birefringent crystal.

6. The wavelength tunable filter of claim 3, wherein the exciting means includes an acoustical transducer bonded to the crystal.

7. The wavelength tunable filter of claim 3, wherein the acousto-optical crystal and said optical mirror are bonded to a substrate.

8. The wavelength tunable filter of claim 7, wherein the substrate has a low thermal expansion coefficient to reduce thermally induced performance instability.

9. The wavelength tunable filter of claim 1, wherein said acousto-optic filter is aligned approximately at the Bragg angle relative to the incident light ray and is maintained at approximately the Bragg angle for all wavevectors within the tuning range.

10. The wavelength tunable filter of claim 9, wherein said incident light ray to said tunable filter is a collimated light ray.

11. The wavelength tunable filter of claim 1, wherein each selected wavevector enters the filter at the Bragg angle and the output light ray exits the filter at twice the Bragg angle.

12. The wavelength tunable filter of claim 1, wherein said optical mirror is aligned approximately parallel to said optical medium so that each reflected angle is approximately the Bragg angle opposite to the incident angle.

13. The wavelength tunable filter of claim 1, wherein the distance between said optical mirror and said optical medium is adjustable.

14. The wavelength tunable filter of claim 1, wherein one or more optical components are inserted into the optical path between the incident light ray and the output light ray.

15. The wavelength tunable filter of claim 14, wherein one of the inserted optical components is an optical phase modulator.

16. A method for reducing frequency shift in an acousto-optical tunable filter, said filter including an acousto-optical active medium, acoustic transducer and a mirror, said acoustic transducer coupled to the active medium to set up acoustic waves in the medium, said mirror positioned to reflect a diffracted wave from said medium back to said medium and having and having an optical characteristic taken from the group consisting of: concave, convex, optically dispersive, or any combination thereof, said method comprising:
- exciting an acoustic wave of a particular frequency in said optical medium;
- transmitting an incident light ray to the medium, wherein said incident ray includes one or more wavevectors, all or a portion of which are within a tuning range of the filter;
- diffracting each wave vector within the tuning range and selected by the particular frequency, each diffracted wavevector having a frequency shift;
- receiving each diffracted wavevector at a non-orthogonal incident angle;
- reflecting each diffracted wavevector at a reflected angle opposite the incident angle back to said medium; and
- diffracting each reflected wavevector to form the output light ray, each diffracted ray having a compensating frequency shift so that the output light ray has a reduced frequency shift.

17. An acousto-optical tunable filter comprising:
- an optical medium whose refractive index is alterable by acoustic waves, said optical medium receiving an incident light ray that includes one or more wavevectors, all or a portion of which are within a tuning range of the filter;
- means for exciting an acoustic wave of a particular frequency in said optical medium so that each wavevector of the incident light ray selected by the particular frequency and within the tuning range is diffracted by said optical medium, each diffracted wavevector having a frequency shift; and
- an optical mirror having a total reflection or prescribed reflectivity to meet the tuning range, said optical mirror positioned to receive each diffracted wavevector at a non-orthogonal incident angle and to reflect each received diffracted wavevector at a reflected angle opposite the incident angle back to said optical medium, wherein said optical medium diffracts each reflected wavevector to produce an output light ray having a compensating frequency shift in each reflected wavevector, thereby substantially reducing or eliminating any frequency shift in the output light ray;
- wherein said optical mirror has an optical characteristic taken from the group consisting of: concave, convex, optically dispersive, or any combination thereof.

* * * * *